May 29, 1928.
H. W. HOLDSWORTH
BEARING MOUNTING
Filed March 5, 1925
1,671,720
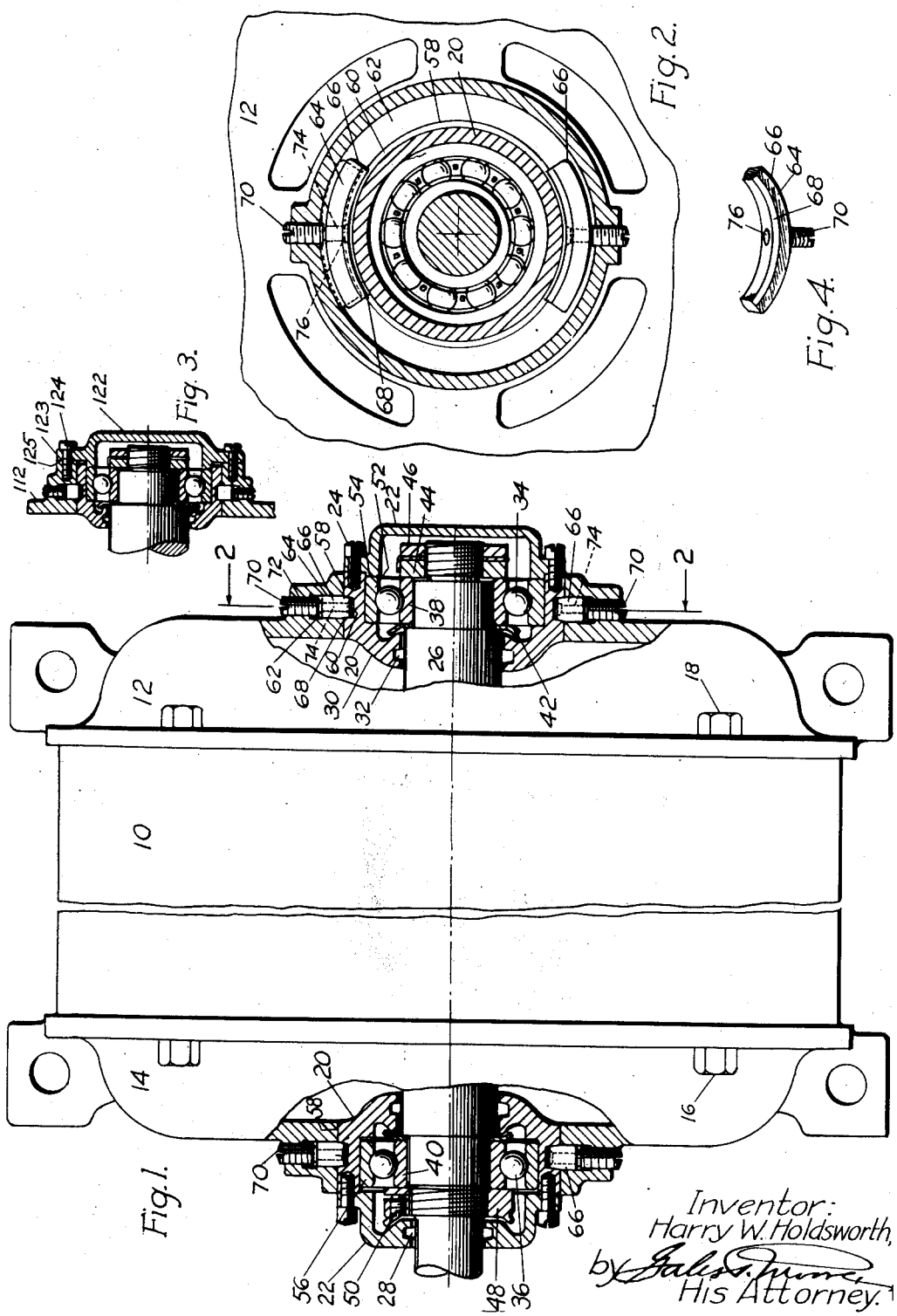
Inventor:
Harry W. Holdsworth,
by [signature]
His Attorney.

Patented May 29, 1928.

1,671,720

UNITED STATES PATENT OFFICE.

HARRY W. HOLDSWORTH, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

BEARING MOUNTING.

Application filed March 5, 1925. Serial No. 13,066.

This invention relates to bearing mountings and is herein shown as embodied in bearing mountings for the shaft of an electric motor.

In mounting the shafts of electrical motors and the like on antifriction bearings, it is desirable to be able to remove the armature and bearings without exposing the bearings to dust or changing the fit of the bearings on the shaft. It is also desirable that the end bells be removable alone without disturbing the bearings, as when getting access to the motor windings. The bearing mounting should also provide support for the shaft in any position between horizontal and vertical.

It is accordingly an object of this invention to provide a construction in which any or all of these results and others can be secured in a simple and inexpensive manner. In one embodiment selected for illustration, the shaft has a ball bearing, with grooved races, enclosed in a housing which has its outer periphery shaped to fit and slide within a corresponding bore in the end bell. The housing and the end bell can be detached, either one from the other, simply by relative axial sliding movement and the two can be fastened in a definite position, against all relative movement, by a locking device, herein shown as a key or keys, each movable in mating channels of the two members by a screw accessible from outside the housing. Hence such a simple implement as a screw driver is all that is required to assemble or detach the parts.

To these ends and also to improve generally upon devices of the character indicated, my invention also consists in the various matters hereinafter described and claimed.

Referring to the drawings, Fig. 1 is an elevation partly in central section.

Fig. 2 is a transverse section on line 2—2 of Fig. 1.

Fig. 3 is a central section, to smaller scale, of a modified construction and

Fig. 4 is a perspective view of a locking key.

The numeral 10 indicates a housing, such as a motor housing, having end bells or plates 12 and 14 which are detachable, secured to the ends of the housing by bolts 16 and 18. Each end bell forms a supporting plate for a bearing housing, herein shown as formed of two sections 20 and 22 fastened together by cap screws 24. Each bearing housing and its end bell are normally secured together in a detachable manner as will be later described. That section 22, shown at the right, forms a cap which encloses the end of a shaft 26 and that section 22, shown at the left, has an opening to surround the shaft and is provided with a groove 28 for a packing. Each section 20 of the bearing housing has a curved inner flange 30 surrounding the shaft and provided with a groove 32 for a packing. Hence, each housing provides a dust and grease proof closure for a bearing, such as ball bearing 34 or 36.

Ball bearings 34 and 36 have their inner grooved race rings 38 and 40, respectively, clamped to the shaft against a shoulder or against an oil slinger 42 which in turn abuts against the shoulder. A nut 44 and lock nut 46, threaded on the reduced end of the shaft, secures the inner race ring 38 and a nut 48, with a locking means 50, is threaded on a reduced portion of the shaft to lock the other inner ring 40. A grooved outer race ring 52 for the ball bearing 34 is preferably securely held in its housing, against a shoulder therein, by a projecting flange 54 on the cap section 22 whereas a grooved outer race ring 56, for the other ball bearing 36, is preferably free to slide in its housing. This allows for expansion and contraction of the shaft. The ball bearing 34, inasmuch as its grooved race ways are fixed on the shaft and in the housing, will take both radial and thrust load in any position of the shaft from horizontal to vertical. The inner race rings are preferably, but not necessarily, pressed on the shaft.

Each bearing housing has a smooth cylindrical outer surface 58 adapted to fit and slide through a corresponding opening bored through the end bell. Relative axial or rotary movement of the members is conveniently prevented by one or more radially movable locking members, accessible for operation from outside the housing. As shown, each bearing housing has a channel or groove 60, preferably tapered, arranged to register with a corresponding channel or groove 62 in the end bell, the channel 62 having straight sides to embrace the sides 64 of one or more curved keys 66. Each key is of less depth than the channel 62 so that it can be entirely withdrawn into it and its sides terminate in bevelled faces 68 arranged to engage the tapered channel 60, thereby both locating and locking the end bell and bearing housing against all relative movement and locating them in a definite position.

For sliding the keys, screws 70 are threaded in tapped radial openings 72 in bosses on the end bells. Each screw has a reduced portion 74 which is swivelled in its key, the end of the reduced portion having a little head 76 set in a countersunk opening in the key to operatively connect the two members together. Hence, a screw driver is the only tool necessary to release the bearing housings from the end bells and to effect their locking. No expensive machining is required for any of the parts. It will be noted that each bearing housing is capable of passing through, from one side of the end bell to the other, in either direction and that either end bell can be detached by itself without disturbing other parts. Whichever parts are detached, the bearings are kept housed and their fit on the shaft maintained.

Although an armature or rotor on a shaft will ordinarily be too large to pass through the bore in the end bell, nevertheless there are conditions when a similar shaft may carry only such intermediate members as will readily pass through such an opening in an end supporting plate of a housing. Hence, neither end plate will have to be disturbed to release such a shaft and bearings. Access to the bearings alone is securable by merely detaching the cap sections of the bearing housings and, by backing off the nuts, either bearing housing and its bearings can be individually removed and replaced by mere axial movement.

In Fig. 3, the construction may be the same throughout, with the exception that the cap section 122 has its peripheral flange 123 extended to overlie a smooth face 125 machined on the outer face of the end bell 112 and the fastening screws 124 are threaded in the end bell.

Although the invention has been described by reference to certain specific embodiments, it should be understood that, in its broader aspects it is not necessarily limited to the forms selected for mere illustrative purposes.

I claim:

1. In apparatus of the character described, in combination, a motor casing, a detachable end bell therefor, a shaft having a bearing, a bearing housing having its periphery shaped to fit and slide through a corresponding opening extending through the end bell, said housing and end bell being detachable, either one from the other, simply by relative axial movement, and means for locking the end bell and bearing housing together against axial movement in either direction; substantially as described.

2. In apparatus of the character described, in combination, a shaft, an antifriction bearing on the shaft, a housing enclosing the bearing and having its outer surface cylindrical, a supporting plate having a bore fitting the outer surface of the bearing housing, said supporting plate and bearing housing being detachable, either one from the other, simply by relative sliding movement, and means for locking the supporting plate and bearing housing against relative sliding movement; substantially as described.

3. In apparatus of the character described, in combination, a shaft, an antifriction bearing on the shaft, a housing enclosing the bearing and having its outer surface cylindrical, a supporting plate having a bore fitting the outer surface of the bearing housing, said supporting plate and bearing housing being detachable, either one from the other, by relative sliding movement, and a radially movable locking key for locking said plate and housing against relative sliding movement; substantially as described.

4. In apparatus of the character described, in combination, a shaft, an antifriction bearing on the shaft, a housing enclosing the bearing, said housing having a cylindrical outer surface, a supporting plate having a bore fitting the outer surface of the bearing housing, and means movable radially in the supporting plate for locking the bearing housing and the supporting plate against relative axial movement; substantially as described.

5. In apparatus of the character described, in combination, a shaft, an antifriction bearing on the shaft, a housing enclosing the bearing, said housing having a cylindrical outer surface with a channel therein, a supporting plate having a cylindrical bore fitting the outer surface of the bearing housing, said supporting plate having a channel adapted to register with the channel in the bearing housing, and a key carried in one of said channels and adopted to partially enter the other to lock the bearing housing and supporting plate against relative movement; substantially as described.

6. In apparatus of the character described, in combination, a shaft, an antifriction bearing on the shaft, a housing enclosing the bearing, said housing having a cylindrical outer surface with a channel therein, a supporting plate having a cylindrical bore fitting the outer surface of the bearing housing, said supporting plate having a channel adapted to register with the channel in the bearing housing, a key fitting in one of said channels and adapted to partially enter the other, and a screw accessible outside the housing for moving said key; substantially as described.

7. In apparatus of the character described, in combination, a shaft, an antifriction bearing on the shaft, a housing enclosing the bearing, said housing having a cylindrical outer surface with a channel therein, a supporting plate having a cylindrical bore fitting the outer surface of the bearing housing, said supporting plate having a channel adapted to register with the channel in the bearing housing, a key fitting in the channel of the supporting plate and having inclined sides arranged to enter the channel in the bearing housing, and a screw threaded in the supporting plate and having connection with the key for moving the latter; substantially as described.

8. In apparatus of the character described, in combination, a casing, detachable end plates for the casing, a shaft having spaced bearings, bearing housings having their outer peripheries shaped to fit and slide entirely through corresponding openings extending through both of the end plates, said bearing housings and end plates being detachable, either one from the other, by relative sliding movement in either direction; substantially as described.

9. In apparatus of the character described, in combination, a casing, a detachable end plate therefor, a bearing housing having its outer periphery shaped to fit and slide entirely through a corresponding opening extending through the end plate, a shaft, a ball bearing having grooved races to take thrust and radial load, said bearing having one race held by the shaft and the other by the bearing housing, and means for locking the bearing housing to the end plate against axial movement to furnish endwise support for the shaft in any position of the latter between horizontal and vertical; substantially as described.

In testimony whereof I hereunto affix my signature.

HARRY W. HOLDSWORTH.